United States Patent
Nakhjiri et al.

(10) Patent No.: US 8,856,509 B2
(45) Date of Patent: Oct. 7, 2014

(54) SYSTEM AND METHOD FOR COGNIZANT TRANSPORT LAYER SECURITY (CTLS)

(75) Inventors: Madjid F. Nakhjiri, San Diego, CA (US); Tat Keung Chan, San Diego, CA (US); Alexander Medvinsky, San Diego, CA (US)

(73) Assignee: Motorola Mobility LLC, Chicago, IL (US)

( * ) Notice: Subject to any disclaimer, the term of this patent is extended or adjusted under 35 U.S.C. 154(b) by 20 days.

(21) Appl. No.: 13/207,394

(22) Filed: Aug. 10, 2011

(65) Prior Publication Data

US 2012/0042160 A1     Feb. 16, 2012

Related U.S. Application Data

(60) Provisional application No. 61/372,188, filed on Aug. 10, 2010.

(51) Int. Cl.
*H04L 29/00* (2006.01)
*H04L 9/32* (2006.01)
*H04L 9/08* (2006.01)
*H04L 29/06* (2006.01)

(52) U.S. Cl.
CPC .......... *H04L 63/0884* (2013.01); *H04L 63/166* (2013.01); *H04L 9/3271* (2013.01); *H04L 9/0844* (2013.01); *H04L 63/105* (2013.01); *H04L 63/067* (2013.01); *H04L 9/321* (2013.01); *H04L 63/0892* (2013.01); *G06F 2221/2129* (2013.01)
USPC ........ 713/151; 726/5; 726/7; 726/10; 705/44; 705/67; 455/411; 455/3; 370/355; 713/158

(58) Field of Classification Search
CPC .............................. H04L 63/0428; H04L 9/08
USPC ......................................................... 713/151
See application file for complete search history.

(56) References Cited

U.S. PATENT DOCUMENTS

| | | | |
|---|---|---|---|
| 7,194,763 B2 * | 3/2007 | Potter et al. ........................ | 726/7 |
| 7,325,246 B1 * | 1/2008 | Halasz et al. ..................... | 726/2 |
| 7,549,048 B2 * | 6/2009 | Freeman et al. .............. | 713/171 |
| 7,627,896 B2 * | 12/2009 | Herrmann ........................ | 726/14 |
| 7,823,187 B2 * | 10/2010 | Tanaka et al. ..................... | 726/1 |

(Continued)

OTHER PUBLICATIONS http://www.quintillion.co.jp/3GPP/Specs/33222-910.pdf|3GPP TS 33.222 V9.1.0 (Jun. 2010) Technical Specification|pp. 1-22|Jun. 2010|3GPP.*

(Continued)

*Primary Examiner* — Mahfuzur Rahman
(74) *Attorney, Agent, or Firm* — Fox Rothschild LLP (57) ABSTRACT

A method of authentication and authorization over a communications system is provided. Disclosed herein are systems and methods for creating a cryptographic evidence, called authentication/authorization evidence, AE, when a successful authentication/authorization between a client and an authentication server is complete. There are a variety of methods for generating AE. For instance, the AE can be data that is exchanged during the authentication signaling or data that results from it. A distinctive point being that AE results from the authentication process and is used as prior state for the following TLS exchange. An example for creation of AE, is as follows: EAP authentications typically result in an Extended Master Session Key (EMSK). The EMSK can be used to create an Evidence Master Key (EMK) that can then be used to create AE for a variety of servers.

15 Claims, 4 Drawing Sheets

(56) References Cited

U.S. PATENT DOCUMENTS

| | | | | |
|---|---|---|---|---|
| 7,865,727 | B2* | 1/2011 | Zeng et al. | 713/168 |
| 8,181,262 | B2* | 5/2012 | Cooper et al. | 726/28 |
| 8,201,233 | B2* | 6/2012 | Beaulieu et al. | 726/9 |
| 8,447,984 | B1* | 5/2013 | Siegel et al. | 713/173 |
| 2003/0028805 | A1* | 2/2003 | Lahteenmaki | 713/201 |
| 2003/0172090 | A1* | 9/2003 | Asunmaa et al. | 707/200 |
| 2005/0124288 | A1* | 6/2005 | Karmi et al. | 455/3.01 |
| 2005/0287990 | A1* | 12/2005 | Mononen et al. | 455/411 |
| 2006/0174117 | A1* | 8/2006 | Laitinen | 713/169 |
| 2006/0183463 | A1* | 8/2006 | Falk et al. | 455/411 |
| 2006/0291455 | A1* | 12/2006 | Katz et al. | 370/355 |
| 2008/0127317 | A1* | 5/2008 | Nakhjiri | 726/6 |
| 2008/0178004 | A1* | 7/2008 | Wei et al. | 713/171 |
| 2008/0273704 | A1* | 11/2008 | Norrman et al. | 380/278 |
| 2009/0209232 | A1* | 8/2009 | Cha et al. | 455/411 |
| 2009/0210696 | A1* | 8/2009 | Moreau | 713/151 |
| 2009/0210712 | A1* | 8/2009 | Fort | 713/175 |
| 2009/0287922 | A1* | 11/2009 | Herwono et al. | 713/155 |
| 2009/0300744 | A1* | 12/2009 | Guo et al. | 726/7 |
| 2009/0313477 | A1* | 12/2009 | Park et al. | 713/182 |
| 2009/0327704 | A1* | 12/2009 | Hatlelid | 713/156 |
| 2010/0017593 | A1* | 1/2010 | Putz | 713/150 |
| 2011/0010768 | A1* | 1/2011 | Barriga et al. | 726/11 |
| 2011/0047373 | A1* | 2/2011 | Karasawa et al. | 713/156 |
| 2011/0283103 | A1* | 11/2011 | Eyal et al. | 713/156 |
| 2012/0023568 | A1* | 1/2012 | Cha et al. | 726/10 |
| 2012/0222091 | A1* | 8/2012 | Castellanos Zamora et al. | 726/3 |
| 2013/0097429 | A1* | 4/2013 | Grandcolas et al. | 713/185 |

OTHER PUBLICATIONS

Role Based Privilege Management Infrastructure|http://kar.kent.ac.uk/13778/1/PermisChad.pdf| Chadwick et al.|2003|pp. 1-9.*

PCT Search Report and Written Opinion, RE: Application #PCT/US2011/047313; Jun. 28, 2012.

"3rd Generation Partnership Project; Technical Specification Group Services and System Aspects"; Generic Authentication Architecture (GAA); Generic bootstrapping architecture (Release 9), 3GPP Standard; 3GPP TS 33.220, 3rd Generation Partnership Project (3gpp), Mobile Competence Centre; 650, Route Des Lucioles; F-06921 Sophiaantipolis Cedex ; France, No. V9.3.0, Jun. 16, 2010, pp. 1-75.

"3rd Generation Partnership Project; Technical Specification Group Services and System Aspects; Generic Authentication Architecture (GAA); Access . . . Security (HTTPS) (Release 9)", 3GPP Standard; 3GPP TS 33.222, 3rd Generation Partnership Project (3GPP), Mobile Competence Centre; 650, Route Des Lucioles; F-06921 Sophiaantipolis Cedex; France, No. V9.1.0, Jun. 16, 2010, pp. 1-22.

3GPP TS 33.220 v10.0.0 (Oct. 2010), Technical Specification, 3Rd Generation Partnership Project; Technical Specificiation Group Services and System Aspects; Generic Authentication Architecture (GAA); Generic Bootstrapping Architecture (GBA) (Release 10), 75 pages.

Eronen and Tschofenig, Network Working Group, Request for Comments: 4279, Category: Standards Track, Dec. 2005, Pre-Shared Key Ciphersuites for Transport Layer Security (TLS) 16 pages.

Neuman et al., Network Working Group, Request for Comments: 4120, Obsoletes: 1510, Category: Standards Track, Jul. 2005, The Kerberos Network Authentication Service (V5) 138 pages.

* cited by examiner

SYSTEM AND METHOD FOR COGNIZANT TRANSPORT LAYER SECURITY (CTLS)

RELATED APPLICATIONS

This application claims priority from U.S. provisional application No. 61/372,188, filed Aug. 10, 2010, which is incorporated by reference herein in its entirety.

BACKGROUND

Conditional access systems (CAS) protect high value content from unauthorized viewing by encrypting the content stream prior to distribution. Access control to the content is enforced by providing the content decryption keys only to authorized devices. Traditionally, the association of a device to a subscriber has been static, meaning that following completion of subscription contracts with a service provider (SP), the SP provides a device (e.g., a set top box) to the subscriber, which may be installed at the subscriber's permanent location. In this way a permanent subscriber-device relationship (binding) can be configured at the service provider data bases and CAS servers, distributor head end and streaming equipments. During this configuration, a device's identity and credentials would be added to the list of devices authorized to receive content decryption keys.

With advances in mobile computing and networking technologies as well as new trends in consumer behavior, new demands are being placed on the content supply chain: content needs to be available from any source, including traditional distributor networks, the Internet and wireless networks. The business models interacting with the consumer are also expanding: A subscriber with a business contract with a service provider (SP) may wish to view the subscribed content on devices other than her home set top (e.g. a mobile phone), or at locations other than her home, e.g. on a set top in a hotel or a friend's house. The subscriber may also wish to view content on demand, either from her service provider catalogue or from a $3^{rd}$ party Internet sources.

Support for the aforementioned supply chain and business models go beyond the traditional mechanisms in which a manufacturer simply provides a database of device identifier and keys to the operator and the operator then binds the device identity to the subscriber who received the device. If the subscriber has acquired the device through retail channels, the SP may have no a priori knowledge of the device or the fact that the device will be used by this particular subscriber. Furthermore, with the growing list of types of devices that can render content, the SP may have no information about the device's fitness (e.g., robustness properties and other capabilities) for rendering content on the device without risking the content owner's business interest. Another issue that complicates the scenario is that each of these devices may obtain network connectivity/packet transport through a different access technology or a separate network provider (NP) and it is desirable for the details of network connectivity to be transparent to the SP authorization and CAS processes.

Given that the business contract is typically between a subscriber and a SP, the authorization to view content needs to be enforced by a trust relationship that is built based on subscriber profile (subscriber identity, credentials, and subscription profile). However, since the content needs to be delivered to and decrypted by the device, the distribution of content and content decryption keys needs to take into account the device characteristics such as device identity, private keys, and robustness profile (i.e., the ability of a device to protect valued assets such as content and keys as required by owners and distributors).

The above requirements place new demands on SP security procedures: The SP needs to not only authorize the subscriber based on the underlying business model and subscription profile, but also ensure that the content is consumed (or equivalently, ensure that content decryption keys are obtained) only on a device that is properly associated to that authorized subscriber for the particular content that is to be consumed and only for the period of time during which the authorization is provided. The SP must also ensure that such transport is not threatened by passive eavesdropping of the keys, or redirection of the keys to unintended devices. This means that the SP not only needs to authenticate the device that the subscriber is currently using, but also ensure that an authorized subscriber is actively present at the device and is not being impersonated by service/content thieves.

From the Digital Rights Management (DRM) perspective, it is also important for the SP to know the level of robustness with which the device can store and execute sensitive material related to the distributed content so the SP can avoid the risk of piracy.

Another design consideration is that current subscriber authentication is often based on cryptographically weak methods and credentials, such as passwords and four-digit personal identification number (PINs). Such authentication credentials and methods, if not adequately protected, may not only jeopardize the consumer's privacy (e.g., location, identity) but also lack non-repudiation mechanisms that leave both the consumer and SP vulnerable to service theft. For instance, a system that actively involves the subscriber in the authorization process denies the subscriber the ability to dispute a previously consumed service (e.g. a movie watched) while at the same time protecting the consumers from having to pay for content consumed by others. An active and dynamic binding of subscriber and device credentials could provide indisputable evidence that the subscriber participated in the transaction. Thus the overall mechanism should be such that subscriber credentials are protected from tampering and eavesdropping.

It may also be desirable for the security procedures to provide the option of fast re-authorizations, so that a subscriber does not have to go through the lengthy authentication and binding process after having paused or interrupted the connection. For instance, subscribers should be able to access their services on a device in a hotel room with little delay during the entire period of 24 hours after having paid for 24 hours of service.

Finally, in Internet-type architectures, authorization and authentication is typically performed by an authentication and authorization (AAA) server, which has nothing to do with the actual content distribution. The content distribution and rights management are typically performed by DRM/CAS systems that can be independent of the SP authorization system and which are often provided by third party suppliers. Thus, the result of an authentication and binding process as described above needs to be communicated to a CAS. Such interfaces between the AAA server and CAS systems have not been currently available.

EAP-TTLSv0, (Extensible Authentication Protocol) which is described in RFC5281, provides a method that allows a client to first establish a tunnel with a server (typically based on server-only authentication) and then authenticate itself using weak authentication mechanisms/credentials which are delivered to the server through the tunnel (this is called inner authentication). EAP-TTLS also allows clients to perform multiple inner authentications using different sets of credentials. EAP-TTLSv0 does not bind the tunnel protocol to the inner authentication method(s), nor does it bind the multiple inner authentications to each other. In addition, multiple inner authentications can only authenticate the same entity, meaning that the client is from a cryptographic point of view one and the same entity. EAP-TTLSv0 provides session resumption using the native transport layer security (TLS) mechanism with unprotected session IDs. Due to its lack of method bindings and single client nature, EAP-TTLS does not provide any adequate subscriber-device binding.

PEAPv0 and EAP-FAST provide similar tunneling mechanisms. Both methods further provide a cryptographic binding between the tunnel and the inner authentication(s) by creating dependencies in the derivation of session keys. In particular, keys from tunnel and inner authentications are combined to derive MAC keys used in the remainder of the session and to generate the Master Session Key (MSK). Similar to EAP-TTLSv0, PEAPv0 and EAP-FAST both provide session resumption per TLS abbreviated handshake. In addition, EAP-FAST supports session resumption using protected access credentials in the form of tokens. Still none of PEAPv0 and EAP-FAST can bind the authentications of two different entities to a tunnel and, thus, cannot provide an adequate subscriber-device binding.

In 3GPP general bootstrapping architecture (GBA) [3GPP TS 33.220], integration of previous authentication to current security establishment exchanges is done by the authentication server (HSS) sending the AKA Authentication Vectors (AVs) to the BSF (bootstrapping function), which extracts AUTN and RAND and sends them to the UE, which after verifying the AUTN, calculates the RES and sends it back to the BSF and after that they establish a Ks=(CK||IK).

This method is based on use of SIM cards which use symmetric encryption and not certificates or TLS. Solutions where states resulting from a previous authentication can be included in TLS exchanges do not exist.

Kerberos is another area where an authentication server initially authenticates a client and issues tickets for the client to deal with other servers. The downside is that Kerberos ticket granting mechanism relies on specific Kerberos protocol and the client needs to prior to interacting with each new server go back to the initial ticket issuing server and get a new ticket for the new server. The idea described here eliminates this step while not requiring any specific protocol interactions with the TLS server.

IETF RFC4279 proposes mechanisms for use of pre-shared keys (PSK) with TLS and even uses PSK to build a premaster secret. However, this RFC defines use of pre-shared keys instead of public key certificates for environments where either the client has limited computation capacity or certificates are not available because PKI is not available. The usage scenario of RFC4279 is distinguished from the methods described herein, because while RFC4279 removes the certificate and certificate request payloads for the exchange. In contrast, in the embodiments described herein, device and server both have capability to use certificates and do actually use the certificates to establish the TLS but the security policy dictates that the authorization profiles of the device and subscriber must be checked by another authority before allowing the client to establish the TLS with the current server. Also the RFC proposes changes to the main line TLS (RFC 4346) stack, since it introduces new attributes (e.g. PSK-identity) that use pre-shared keys instead.

None of the previously mentioned authentication and authorization methods treats the device and the subscriber as two separate entities. Rather, in these methods the client is the same entity who performs multiple layers of authentications using different credentials. They do not take into account the situation where a device can have its own identity/certificate while the user (e.g., a subscriber) is a human with a different identity/credential pair. That is, known techniques do not take address those cases or solve the problem in which the device and subscriber may have a physically, logically and cryptographically loose existence.

SUMMARY OF THE INVENTION

One embodiment includes a method of authentication and secure communication establishment between a first server and a device over a communication system, comprising a second server performing a first authentication process with the device using a first set of device credentials, the first authentication process including creation of a set of at least one authentication evidence at the device and the second server, wherein the first server performs a second authentication and secure tunnel establishment protocol with the device, using the authentication evidence created during the first authentication, as a second authentication factor. The method can further comprise wherein the authentication evidence is provided by the second server to the first server through a communication exchange, on at least one of the conditions of the first server requesting for authentication evidence when needed, and the second server providing the authentication evidence proactively.

In one embodiment, the method further comprises the first authentication process creating an evidence master key that is used to create more than one cryptographically separate authentication evidences distinguished by at least one of the service identifier, server identifier and authentication evidence number. The first authentication process can be an Extensible Authentication protocol (EAP) process. The authentication evidence may not be directly available to the first server and the first server can perform verification of the authentication evidence on behalf of the second server when requested.

In yet another embodiment, the first authentication further comprises a subscriber authentication using subscriber credentials. The second authentication and secure tunnel establishment protocol can be at least one of Transport Layer Security (TLS) and Secure Socket Layer (SSL). The authentication evidence can be used as a random number within the key exchange for secure tunnel establishment.

In another embodiment, the authentication evidence uses at least one of the pre-master key, client random key and a pre-shared key. The subscriber authentication can use at least one of the pre-master key, client random key and a pre-shared key. After the second authentication and secure tunnel is completed, the authentication evidence can be used as an additional authentication factor in a follow up authentication exchange.

In one embodiment, the method further comprises aborting the secure tunnel if the follow up authentication exchange fails. The follow up authentication exchange can be a challenge response mechanism using the authentication evidence as a secret residing at least at one of the first and the second servers.

In one embodiment, a network-enabled device for use in a communication system comprises a first component configured to engage in a first authentication exchange with a server and create a set of at least one authentication evidence; a second component configured to engage with another server to perform an authentication and secure tunnel establishment protocol, using the authentication evidence as an authentication factor; and an authentication and authorization arrangement, comprising: a first server configured to authenticate a device and establish a secure tunnel based on a set of device identity and credentials; and a second server configured to authenticate a device and create a set of authentication evidence and assist the first server in use of the authentication evidence in establishment of the secure tunnel.

DETAILED DESCRIPTION

As detailed below, an authentication and authorization technique is provided in which a subscriber X is using a device Y to request a (e.g., subscription) service S at time T.

Figure 1:
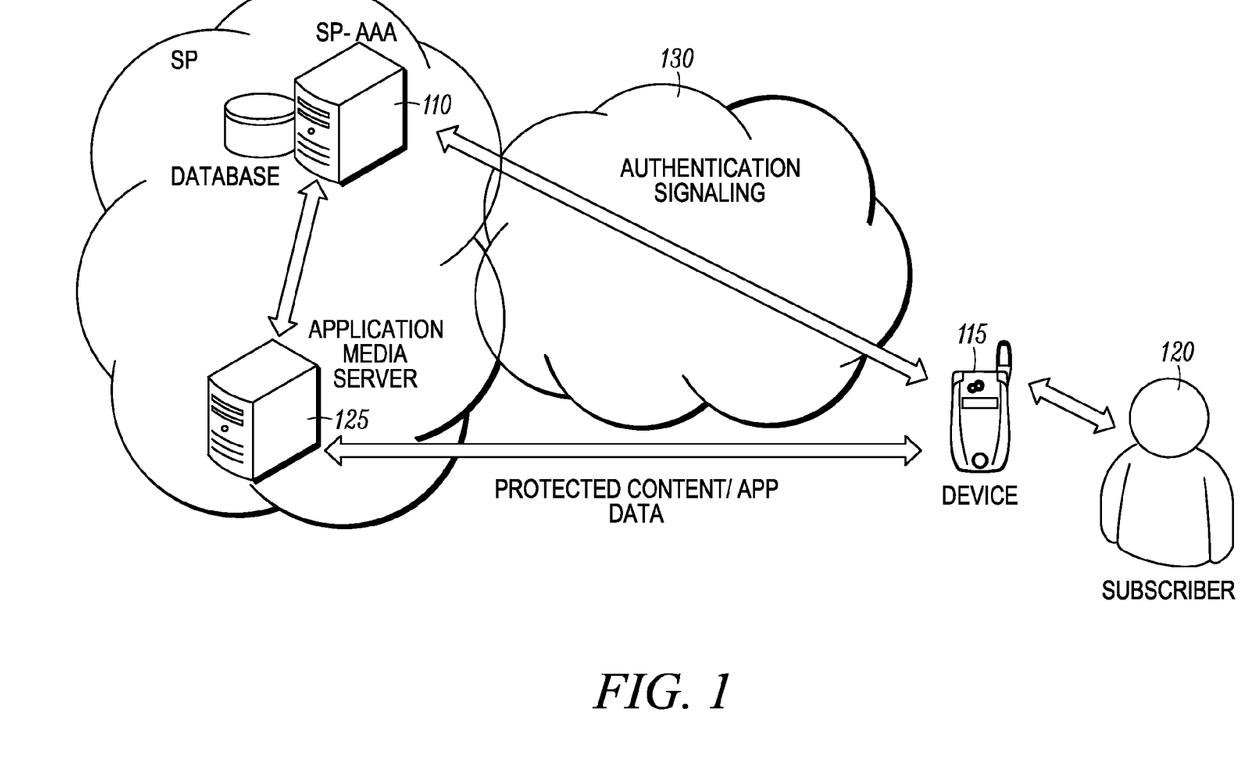
FIG. 1 shows one example of an operating environment in which the authentication and authorization processes described herein may be implemented.

FIG. 1 shows one example of an operating environment in which the authentication and authorization processes described herein may be implemented. A service provider 105 performs authentication and authorization functions, typically using a Service Provider Device Authentication Authorization and Accounting server (SP-AAA) 110. The SP-AAA 110 may be divided into two components, one for authenticating and authorizing devices such as device 115 and one for authenticating and authorizing subscribers such as subscriber 120. The component which authenticates and authorizes the device may be referred to as a SP-device AAA (SP-DAAA) and the component which authenticates and authorizes subscribers may be referred to as a subscriber AAA (SP-SAAA). In some implementations the SP-DAAA and SP-SAAA may be separated logically and even physically. In these implementations the two components will need to communicate through robust and secure channels (e.g. IPsec/transport layer security (TLS)) and share sensitive data to make their separation transparent to the device 115. For convenience, the following description will refer to both components as an SP-AAA, as if they were in one and the same physical and logical devices, except in those cases where a separation of the two functions requires special handling.

After performing the authentication and binding process described below, the SP-AAA can provide evidence of the actions which were performed to an application server 125. In this way the application server 125 can in turn perform its function (e.g., delivering a service) based on the assumption that it is dealing with an authenticated and authorized device/subscriber pair. In a general case, the application server 125 may be a server that provides application services to the device/subscriber pair. For example, the application service may deliver Electronic Program Guide (EPG) data, a gaming service, Internet based video services, and so on. In one particular implementation, the application server 125 may be a CAS/DRM server that provides conditional access services, such as providing rights and licenses to devices and providing content encryption keys to servers that stream encrypted content to authorized devices.

Device 115 is generally indicative of a wide variety of network-enabled devices and is not intended to suggest any limitation as to the scope of use or functionality of the system(s) and methods described herein. For example, device 115 may be a consumer electronic device such as a mobile phone, a personal digital assistant, a personal computer, a personal media player, a computer/television device, a set-top box, a hard-drive storage device, a video camera, a DVD player or another type of known or later developed electronic device. Device 115 communicates with service provider 105 over communications network 130. Communication network 130 may be any suitable network such as, for example, a Wireless Wide Area Network (WWAN), WiMax, 3GPP, terrestrial or a satellite transmission network, and/or a landline transmission network, such as a Wide Area Network (WAN), DSL, fiber or cable network.

Following a trigger indicating the subscriber's intent to request a service and the discovery of adequate Service Provider (SP) information, the device engages in an authentication exchange with the SP-AAA (or with the SP-DAAA in those implementations where the S-DAAA and the SP-SAAA are separate entities). The result is the establishment of a set of credentials that prove the device has been authenticated by the SP-AAA. In some implementations a secure tunnel may also be established, which protects the signaling messages communicated later.

After the secure tunnel is established subscriber authentication and binding of a device identity and a subscriber identity begins. The subscriber may receive an indication from the device that she needs to enter her identity/password and any other credentials that are given to the subscriber, which the subscriber provides. The term password as used herein is used in its most generic sense to represent any credentials (e.g., one time passwords, secure tokens, etc) that are given to the subscriber so that subscriber can prove her identity to the SP.

As part of the subscriber authentication process, the device uses the subscriber credentials to create data that the SP-AAA (or the SP-SAAA if they are separate) can use to compare with its database and verify the authenticity of the subscriber. As part of this process a set of credentials will be generated that are considered as proof that the subscriber is now also authenticated.

Once authenticated, the device presents the proof of authentication to an application server and requests the desired service. The application server is relying on the SP-AAA as a source of trust that the device has in fact been authenticated.

Although IPTV service and content is delivered to the device, the service or content is often only provided to a subscriber, or more often a paying subscriber. Accordingly, subscriber identification and authentication is required to perform authorization for the transfer of content. In certain situations, such identification and authentication is also required for billing functions. To this end, a subscriber profile is created by the Service Provider at time of registration for service or COD purchase. In one embodiment, the profile could include a subscriber identity and credential for later authentication signaling. The profile may also include the type of content and service. The format and syntax of subscriber identity may vary from service provider to service provider and therefore may be difficult to standardize.

Oftentimes, the credentials for subscriber authentication typically are designed to provide an agreeable human experience. But from cryptographic point of view such passwords are weak (explained in further detail below). This means subscriber authentication exchange may require additional cryptographic protection to ensure adequate protection for subscriber and service provider business interest. Such additional protection can be provided through secure tunnels that are established during device authentication process. However, to ensure the tunnel itself is not hijacked by an illegitimate device, it is important to bind the protected subscriber identity to the identity of the device providing the protecting tunnel.

Also of interest for providing identity binding is billing, which is typically performed using subscriber identity, while typical IP-based accounting clients may only have capability to report accounting records only associated with a device identity. To accommodate charging functions that translates accounting information to billing information, the accounting system must be able to perform (or have access to a subscriber management system that holds) a binding between subscriber identity and device identity.

Yet another concern with regard to performing identity binding is preventing service theft through password sharing. There is possibility of a single subscriber handing out her credentials to other persons with legitimate devices to access the IPTV services in parallel. Such password sharing must be prevented unless it is explicitly allowed by the service provider service policy, so that each subscriber is allowed to only use one device to access the same content at any given time. Binding of a device identity to a subscriber identity and allowing only one device binding for each subscriber identity will prevent such password sharing.

As mentioned earlier, exact definition of the subscriber identity is up to service provider policy. Typically the service provider assigns a subscriber identity to the subscriber at the time of registration. Thus, the specification of subscriber authentication and authorization may not be directly dependent on the exact format and syntax of subscriber identity. These mechanisms will be designed in such a way that this information can be carried in an opaque manner. For example, a subscriber identity format can include a provider id to indicate affiliation of an individual subscriber to a service provider.

It is important to make a distinction between a user identity and a subscriber identity to allow multiple users within a family or a team to enjoy the services of a subscription. In that case the user identity/password may simply be applied locally to the device rather than to the service provider authentication/authorization server to simplify the authentication and subscriber databases and procedures. However, further distinction between users associated to a subscriber ID is out of scope of this disclosure.

In order to provide more agreeable human experience, "weak passwords" may be used as subscriber credentials. A weak password is one that can be used multiple times and be remembered by humans, but still adhere to proper human user password properties, such as use of more than 8 characters and mix of alphanumeric and other ASCII characters. This is in contrast to the term "strong password" which refers to random password generated to provide a minimum number of bits of entropy, but may be difficult to be remembered by a human. Thus subscriber authentication must accommodate the use of weak passwords while protecting sensitive subscriber information and credentials. This means the subscriber authentication exchange must be protected by other security means, such as a secure TLS tunnel, especially when such information is being carried over the access network between IPTV receiving devices and the service provider SPA. The TLS tunnel can be established as part of device authentication with the network.

The initial authentication and authorization process is a lengthy and CPU-intensive process that also requires access to device and subscriber information, and also can require that there can be a large number of application servers that come in contact with the end device and subscriber. Thus, it is more scalable to perform such authentication and authorization with a dedicated centralized server that then assist all other application servers with their security needs. For instance, an HTTP streaming server that is required to protect the HTTP transactions by using TLS (i.e. by establishing and HTTPS session (RFC 2818)), such server could simply rely on the knowledge at the central authentication server about state of authentication of the device and subscriber before engaging in TLS establishment. Such knowledge can be conveyed to the application server either through use of tokens or through use of keying material that are only known to an authenticated device/subscriber. Such keying material could be created as a result of a conscious key management design that is an integral part of the initial authentication with the authentication server. In general both CAS/DRM servers and HTTP servers can be seen as special cases of application servers. This means deploying TLS by itself for protecting the HTTP session between the HTTP servers and the device does not provide adequate authorization for protecting the service providers' business interests. This is further illustrated below.

The authentication during TLS handshake exchange is many times unilateral, meaning that while the server presents its certificate to the client to authenticate the server, the client authentication to the server using client certificate is optional. Even in exchanges where the client does perform certificate-based authentication, the purpose of authentication is only to deter the man-in-the-middle attacks in conjunctions with TLS session key exchange and not for authentication and authorization of device for receiving content.

The TLS is performed solely for establishing session keys to protect the HTTP transactions between the HTTP server and client. The result of TLS is not recorded anywhere and cannot be used for any other HTTP servers. Furthermore, the purpose of using HTTPS is to provide a well-defined and secure session closure mechanism. Closing the TLS session will end the HTTPS session. Extending the framework to capture and record the result of this TLS will be extending the HTTP server functionality beyond its intended purpose, as the HTTP server is designed to provide HTTP service not authentication or authorization service.

The authorization to establish HTTPS with an IPTV receiving device needs to be based on a prior authentication of the IPTV receiving device and its subscriber to an authentication server that has access to subscriber profile and device database and a subsequent authorization of device and subscriber to access application HTTP servers. The HTTP server should be able to ascertain that such authentication and authorization has in fact occurred prior to engaging in establishment of an HTTPS with a client. This will prevent unauthorized access to applications as well as denial of service attacks exploiting vulnerabilities of HTTP or TLS launched at the application servers. Suggesting that HTTPS is used as a framework to accomplish device and subscriber authentication is not adequate and not scalable, as one can expect the device may need to establish HTTP sessions with many different applications.

Similarly in the case of CAS servers, typically the main focus of these servers is entitlement signaling and creation and distribution of content scrambling keys. In many systems, CAS servers rely on external middleware to perform device authentication, registration and subscriber management.

Currently, digital certificates are used extensively in many different technical areas. Transport Layer Security (TLS) is a widely used security protocol that has one of the smoothest interfaces with public key infrastructure ("PKI") servers and use of digital certificates. The main characteristic of TLS is that it performs a secure key exchange, whereby, in one embodiment, one side creates a random number and then encrypts the number with the public key of the other side. In another embodiment, the two sides use Diffie-Hellman key exchange to agree on such a number. Once the two parties have the random number, they have a basis for generating one or more shared keys. Aside from TLS, there are other key exchanges similar to TLS, where this type of key exchange takes place. TLS has been widely deployed due to its strength in providing resistance to variety of security attacks. However, TLS uses digital certificates as the sole credential, and thus there are no other cryptographic pre-requisites for performing authentication (TLS handshake mechanism) and establishing a secure channel (TLS record layer).

In one embodiment, an extension of TLS, called the TLS-PSK (Pre-Shared Key) is used, where the authentication is based on a pre-shared key. In such a case, the secure channel is set up solely using the PSK (or additionally with server-side's certificate). On the other hand, in one embodiment, a security architecture or solution needs to rely on truthfulness of a number of pre-conditions as a pre-requisite in addition to the presence of valid certificates to start of the TLS exchange. For example, the server needs to make sure that the client has proper authorizations prior to performing TLS, and thus the mere possession of a trusted certificate is not enough to allow the client to engage in TLS exchange with the server. The text that follows provides examples of such embodiments.

Example 1

In a content distribution system, for example, such as internet protocol television (IPTV), while higher value content is protected by encryption at content level, many lower value services, such social TV, weather, Electronic Program Guide (EPG), etc, may provided through HTTP and only protected only through use of HTTPS (HTTP over TLS). However, many service providers restrict such services to paying subscribers. This means an HTTP server, prior to starting TLS establishment with the client, must ensure the subscriber and her device is authorized for the service (for example, simply owning a certificate is not enough). Such an HTTP server relies on a specialized authentication/authorization server which using the related databases, vets the subscriber for such services. Methods of integrating state regarding a prior authentication/authorization by a third party are required but would make a simple HTTP server more complicated and extend beyond the functionality normally offered by an HTTP server. This is because normally, with two-way authentication, the user gets a session with an HTTP Server after the server verifies a client certificate. However, in order to check that a subscriber is authorized, it is normally not enough to merely verify a certificate. The HTTP Server would have to connect to some specialized back end system to verify that this is an authorized subscriber, her subscription payments are up-to-date, etc. And this is beyond the functionality which is normally offered by an HTTP Server.

Example 2

A remote management/configuration server or a DRM server or ticket/key server may be required to establish a secure connection (TLS) with a device in order to provide software/configuration parameters or keys to the device as long as the subscriber is authorized to receive the related services. A device should not be allowed to contact (establish TLS with) a configuration server or DRM server unless an assertion of the subscriber authentication/authorization is provided to a specialized authentication server prior to the TLS exchange.

Example 3

To protect both the network server and the end device from being the victim of various attacks, any server that needs to engage in a TLS or TLS like exchange needs to ensure that the device has already authenticated to the authentication server and has been granted access to network resources before performing a TLS exchange with the device. This way the server can be protected from unnecessary load from denial of service attacks, as unlike authentication servers such as an AAA server that can withstand large amount of load and be equipped with specific access control list. Other servers, such as device management servers, may not be robust enough to handle unnecessary large requests.

In summary, typically the network servers or HTTP servers are entities that are separate from the authentication/authorization servers and thus, to perform a TLS with the device, they need to obtain state about a prior device authentication to the network.

Currently, verification of conditions such as prior authentication or authorization is not a part of TLS exchange and must be done outside of TLS exchange. A method to make the TLS cognitive of previous authentication with the current TLS exchange is necessary.

Thus, for simplicity, the term TLS is used to refer to the key exchange mechanism, even though there are many TLS-like exchanges where the basis of the key exchange is one party encrypting a random number/pre-secret for the other side with a secret that only the other side has.

The main idea is around the premise of creating a cryptographic evidence (called authentication/authorization evidence, AE) when a successful authentication/authorization between a client and an authentication server is complete.

There are a variety of methods for generating AE. For instance, the AE can be data that is exchanged during the authentication signaling or data that results from it.

It is important to note that AE results from the authentication process and is used as prior state for the following TLS exchange. An example for creation of AE, is as follows: EAP authentications typically result in an Extended Master Session Key (EMSK). The EMSK can be used to create an Evidence Master Key (EMK) that can then be used to create AE for a variety of servers, as shown in the following paragraphs.

Figure 2:
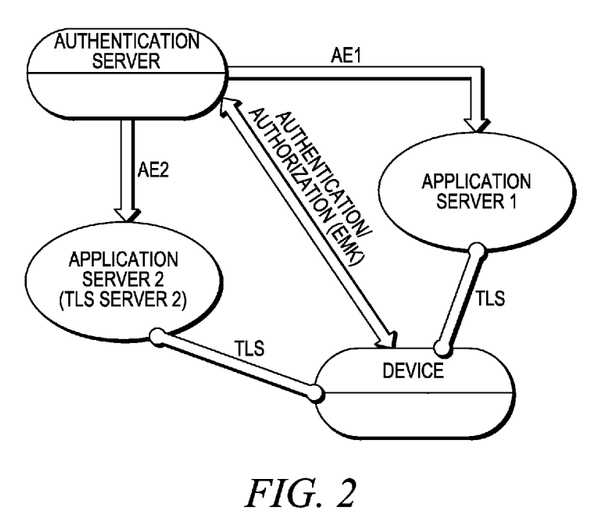
FIG. 2 illustrates one embodiment of an authentication scheme.

As illustrated in FIG. 2, AE (SID, No)=PRF (EMK, "Authentication evidence key creation", TS, SID, No). TS is the Type of Service offered by the TLS server or a server (e.g. HTTP) associated with the TLS server, SID is the server ID. No is an integer in case more than one AE is needed for each TLS server (AE(SID, No) as in AE number No for server SID).

Alternatively, if further authentications are performed following an EAP authentication, e.g. an inner subscriber authentication following an EAP device authentication, the AE may be generated following the inner authentication rather than using the EMSK from the initial EAP-XXX.

It is noted that typically authentication server can calculate the AE. Many times the client can also calculate the AE when engaging in the authentication with the authentication server (such as the case with EAP-based authentications). So when starting to perform TLS exchange with the TLS server, the client typically has the AE readily available, but the TLS server because of being separate from the authentication server has no knowledge of AE (the whole point of this invention) and thus AE needs to be provided to TLS server by the authentication server out of band (see picture). This can be done as a push by the Authentication server or as a pull by the TLS server. The AE transport needs to be secure (signed by authentication server and encrypted with a key unique to the TLS server, e.g. with the TLS server public key, from TLS server certificate).

Also it is noted that AE is only valid for the life time of the authentication between the client and the authentication server, so it cannot be used if it is expired. Thus the life time of the AE must also be communicated to the TLS server.

The following example embodiments are further disclosed for converging AE from previous authentication into a TLS exchange or a TLS session state and making TLS cognizant of prior authentication state.

Example 1

In this embodiment, the TLS client and the TLS server include the prior evidence (AE) directly in the TLS exchange, either directly as a pre-master secret, directly as a client.random numbers, or, indirectly by using AE to create the pre-master secret or client.random.

The TLS client and TLS server include AE directly in the TLS exchange. Inclusion of evidence (AE) in the TLS exchange can be in various ways, for example:

1) For Ciphersuites where the client generates the pre-master secret (i.e. using RSA as the Key Exchange Algorithm), use the AE as the pre-master secret that is sent RSA encrypted by one party to another. The client typically has the AE readily available, so it encrypts the AE as if it were the pre-master secret with the server's public key as it is done in TLS. When the TLS server decrypts the pre-master secret with its private key, it checks it against the AE received from the authentication server and if there is not a match it won't proceed with subsequent TLS exchanges.

2). Use the AE as client.random and in TLS exchanges, once the TLS server receives the client.random, it checks it against the AE received from the authentication server and if no match, it won't proceed. The downside of this method is that the AE can only be used once with the TLS server, since client.random is meant to not repeat. Thus new AE needs to be supplied by the Authentication server. This is applicable even to Diffie-Hellman-based key exchanges, when the pre-master secret is not chosen solely by the client.

3). Use the evidence (AE) with a cryptographic function to create any of the above (pre-master secret or client.random and/or server.random). It is possible to use AE to derive a pre-master secret or client random, however this method is not preferred either, since the derivation method needs to be agreed between the client and the server or pre-configured in advance.

Example 2

The TLS client and the TLS server perform TLS as normal, but once the TLS is completed, they perform a challenge response mechanism to provide the proof of possession of the evidence (AE) to each other.

Figure 3:
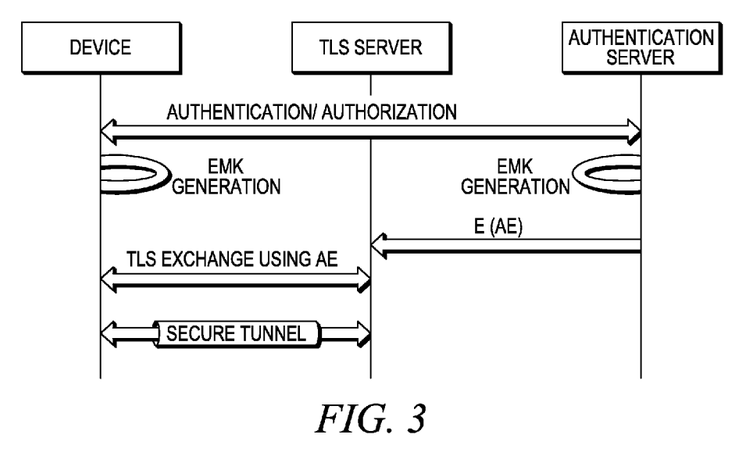
FIG. 3 illustrates one embodiment of the client and server normal TLS function where, once the TLS is complete, the client and server perform a challenge response mechanism to provide the proof of possession of the evidence (AE) on the previous authentication.
Figure 4:
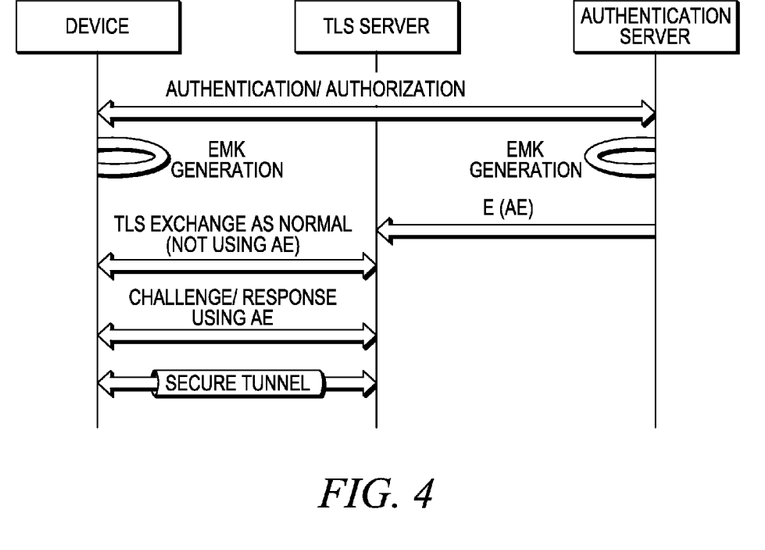
FIG. 4 illustrates the embodiment shown in FIG. 3 except that the TLS exchange does not use AE and the Challenge/Response does use AE.

As shown in FIG. 3, the client and server perform TLS as normal, but once the TLS is completed, they perform a challenge response mechanism to provide the proof of possession of the evidence (AE) on the previous authentication. The challenge response can provide one way or mutual proof of possession. In either way the evidence is not used in the signaling but is used to calculate the responses using common cryptographic algorithms such as a keyed hash function (RES=hash (AE, CHAL). So to allow the TLS server to calculate any data, the evidence needs to be passed to both sides (if not available, which is the typical case for TLS server). Also the algorithm for calculating the responses must be agreed upon between the two TLS parties or pre-configured. The details are shown in FIG. 4 and described below.

1) One way proof of possession: only one side, e.g. the client device provides evidence (AE) for previous authentication. The challenging side (e.g. TLS server on network side) sends a challenge, the responding side (e.g. client) calculates a response based on the evidence and sends a response back. The challenging side recalculates the response locally and checks with the received version.

2) Mutual proof of possession: In case it is desired for the TLS server to show affiliation to a service provider, the TLS server can also show proof of possession of AE (thus affiliation with the authentication server operated by the service provider) to the client. This involves calculation of two challenge/response pairs (server_RAND, client_RES) and (client_ RAND, server_RES). The server sends its challenge (server_RAND), the client sends Client_RES as its response to the server challenge and adds its own challenge (client_RAND), to which the server responds with server_RES. The responses are created using the challenge, the AE and one way hash function. An alternative to two challenge responses, may be providing proof of possessions of some data in any direction.

If any of the authentications fails, the TLS client and server both proceed with aborting the TLS session.

Example 3

Figure 5:
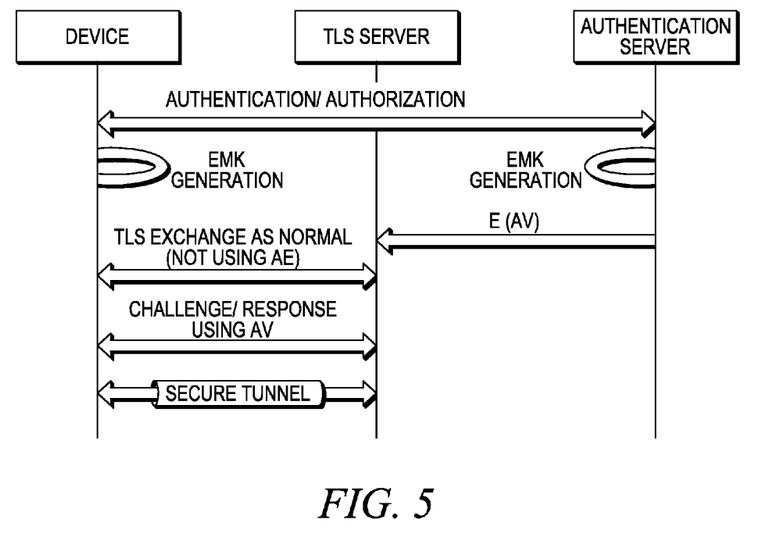
FIG. 5 illustrates an embodiment, as in FIG. 4, except that authentication vectors (AV) are used in place of AEs.

The embodiment illustrated in Example 3 shares the same background as in Example 2, except that in order to avoid the need to pass the evidence to any of the TLS parties (e.g. an authentication server sending the evidence to the TLS server), the authentication server first calculates a number of authentication vectors (AVs), such as challenge/response pairs and authentication data (e.g. all the needed challenges and responses or any other type of authentication data) and pass them along to TLS parties. The TLS server can pass the challenge from the AV to the client and compare the received response from the client with the response included in the AV. The authentication server does not have to reveal the AE to the TLS server and accordingly, the same AE can be used towards all TLS servers without the need for further key derivation. Like 3G AKA, only a server in possession of the master keys calculates the authentication vectors (AV), however, in this case, authorized parties can perform the security functions as long as the receive the authentication vectors can perform the exchanges. Again the authentications can be one-way or mutual, as shown in FIG. 5.

It is noted that a novel distinction discussed in this disclosure over the current systems and methods known in the art, is the insertion of evidence regarding truthfulness of a pre-condition into the TLS exchange or as a condition for TLS session to exist, without changing the TLS signaling or the format of digital certificates that are used for TLS exchange.

This disclosure and the embodiments herein apply to TLS authentication with standard X.509 digital certificates (for both server and client), where TLS needs to be extended to perform an additional authorization check for clients. The authorization is verified through AE (Authentication Evidence) which is utilized by the TLS protocol as described.

In one embodiment, Alliance for Telecommunications Industry Solutions (ATIS) IPTV forum is using TLS for securing sessions between IPTV devices and network servers such as remote configuration and management servers (RCMS) or download servers etc. Furthermore, many Internet based content distribution mechanisms (such as Motorola Medios) use HTTP streaming and use TLS to protect the streaming data. This can provide a secure mechanism to ensure that only paid/authorized subscriber can access the streaming content or services. However, only devices that are authenticated are allowed to establish a session with these servers.

Example 4

In this embodiment, the TLS client and the TLS server include the prior evidence (AE) in TLS exchange using Preshared keys (PSK) instead of certificates as described in RFC 4279. The novelty is that the PSK used in TLS is the AE from the prior authentication. The client can generate AE as described before, while the TLS server get the AE either directly from the Authentication server or through other out of band means (e.g. Authentication server could encrypt the AE with TLS server public key and sign with its own key and then hand the encrypted AE either to a third party that passes it to TLS server or to the client based on request.

THE TLS client may have AE readily available from a previous key exchange with an Authentication Server. In this example, the client begins the TLS handshake with the TLS server by including PSK (Preshared Secret Key) ciphersuites in the ClientHello message. In order to provide two-way authentication, preferably the client includes one of the RSA-PSK ciphesuites such as TLS_RSA_PSK_WITH_AES_256_CBC_SHA which allows the client to verify the identity of the server based on its digital certificate (in addition to the server verifying client identity using PSK). Without server authentication, a rogue server could be established with a purpose of stealing AE values and then authenticating to a real TLS server using the stolen AE values.

The TLS server then replies by selecting one of the PSK ciphersuites and providing one of the optional fields depending on the selected ciphersuite. The server provides its own certificate in the reply if one of the RSA-PSK ciphersuites was selected. And it may optionally provide a "PSK hint" which is an identifier that the client would use to find the correct AE. The hint may be relevant if there are multiple Authentication Servers from which a client can obtain AE.

After the TLS handshake proceeds as specified in RFC 4279, both TLS client and server will construct a pre-master secret based on the value of the PSK (which is AE in this case) and then derive TLS session keys as specified by standard TLS. The TLS server may need to obtain AE from the Authentication Server before it can construct the pre-master secret.

At the end of this exchange, the TLS client and server share a set of session keys that can be used to securely forward digital content or any other services to the client. The exchange is based on AE which ensures that only those clients with proper authorization which had been verified by the Authentication Server are provided with content or services from a TLS server.

Figure 6:
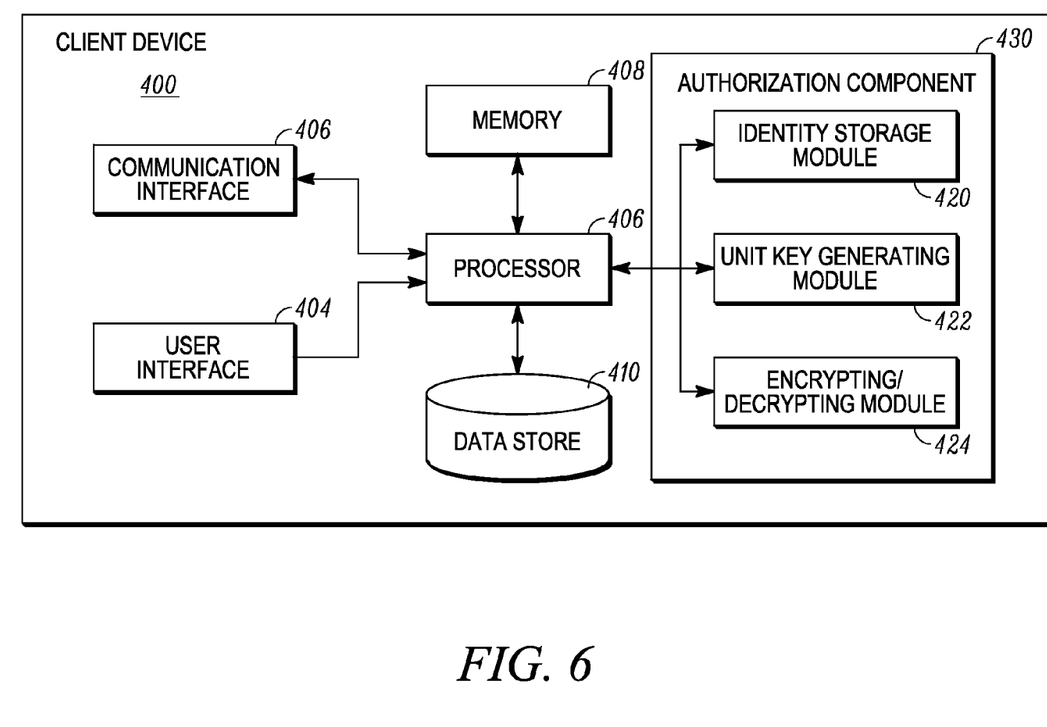
FIG. 6 shows one example of the pertinent components of a network-enabled device.

FIG. 6 shows one embodiment of example pertinent components of a network-enabled device such as device 115 shown in FIG. 1. It should be apparent to those of ordinary skill in the art that FIG. 6 is a block diagram that represents a generalized illustration and that other components may be added or existing components may be removed, modified or rearranged. The client device 400 includes a processor 402, a user interface 404, a communication interface 406, a memory 408, a data store 410 and an authorization component 430.

The authorization component 430 performs the functionality used during the authorization and authentication process and may include, for example, such sub-components or modules as an identity storage module 420 to store cryptographic keys and digital certificates, a key generating module 422 to generate the various sets of keying material used during the process and an encryption/decryption module 424.

The modules 420-424 may comprise software modules, hardware modules, or a combination of software and hardware modules. Thus, in one embodiment, one or more of the modules 420-424 comprise circuit components. In another embodiment, one or more of the modules 420-424 comprise software code stored on a computer readable storage medium, which are executable by one of the processors 402. In a further embodiment, the modules 420-424 may comprise a combination of hardware and software. In some cases the modules 420-424 may be implemented as one more secure hardware modules that are not susceptible to tampering. In any regard, the functionalities of one or more of the modules 420-424 may be combined into a lesser number of modules 420-424 or separated into additional modules without departing from a scope of the invention.

The user interface 404 may comprise a set of keys, buttons, switches, audio transducers, displays and the like through which a user may enter inputs into the client device 440. The communication interface 406 may comprise suitable hardware and/or software to enable the client device 440 to communicate over the content delivery system.

The memory 408 and the data store 410 may comprise any reasonably suitable computer readable storage media, such as, RAM, ROM, EPROM, EEPROM, magnetic or optical disks or tapes, etc. The memory 608 may store respective programs or algorithms that define the functionalities of the processor 602. In this regard, in instances where the modules 420-424 comprise software modules, the modules 420-424 may respectively be stored as software on the memories 408. The data store 410 may store various information that the processor 402 may need in addition to the various keys available in the storage module 420.

Although various embodiments are specifically illustrated and described herein, it will be appreciated that modifications and variations of the present invention are covered by the above teachings and are within the purview of the appended claims without departing from the spirit and intended scope of the invention. For example, while the invention has been described in the context of a conditional access system, which protects content by requiring certain criteria to be met before granting access to content, the invention is also applicable to copy protection schemes, which prevents the unauthorized reproduction of content.

What is claimed is:

1. A method of authentication and secure communication establishment between a first server and a device over a communication system, comprising:

a second server performing a first authentication process with the device including a device authentication using a set of device credentials and a subscriber authentication using at least one subscriber credential, a secure tunnel being established with the device based on the device authentication and being used to perform the subscriber authentication, the first authentication process including creation of a set of at least one authentication evidence at the device and the second server, wherein the first server performs a second authentication process and a secure tunnel establishment protocol with the device, the set of at least one authentication evidence created during the first authentication process being used as a factor in the second authentication process, wherein the set of at least one authentication evidence is provided by the second server to the first server through a communication exchange on at least one of the conditions of the first server requesting for authentication evidence when needed and the second server proactively providing the at least one authentication evidence.

2. The method of claim 1, wherein the first authentication process creates an evidence master key that is used to create more than one cryptographically separate authentication evidences distinguished by at least one of the service identifier, server identifier and authentication evidence number.

3. The method of claim 1, wherein the first authentication process is an Extensible Authentication protocol (EAP) process.

4. The method of claim 1, wherein the at least one authentication evidence is not directly available to the first server and the second server performs verification of the authentication evidence on behalf of the first server when requested.

5. The method of claim 1, wherein the at least one subscriber credential includes a subscriber identity and the device credentials include a device identity, and the first authentication process further comprises binding the subscriber identity to the device identity.

6. The method of claim 1, wherein the second authentication process and secure tunnel establishment protocol is at least one of Transport Layer Security (TLS) and Secure Socket Layer (SSL).

7. The method of claim 1, wherein the at least one authentication evidence is used as a random number within the key exchange for secure tunnel establishment.

8. The method of claim 4, wherein the at least one authentication evidence uses at least one of the pre-master key, client random key and a pre-shared key.

9. The method of claim 5, wherein the subscriber authentication uses at least one of a pre-master key, client random key and a pre-shared key.

10. The method of claim 1, wherein after the second authentication process and secure tunnel establishment is completed, the at least one authentication evidence is used as an additional authentication factor in a follow up authentication exchange between the first server and the device.

11. The method of claim 10, further comprising aborting the secure tunnel if the follow up authentication exchange fails.

12. The method of claim 10, wherein the follow up authentication exchange is a challenge response mechanism using the at least one authentication evidence as a secret residing at least at one of the first and the second servers.

13. A communication system, comprising:
a network-enabled device comprising:
at least one component configured to engage in a first authentication exchange with a server and create a set of at least one authentication evidence, the at least one component being further configured to engage with another server to perform an authentication and secure tunnel establishment protocol, the at least one authentication evidence being used as an authentication factor; and
an authentication and authorization arrangement, comprising:
a first server configured to authenticate a device and establish a secure tunnel with the device based on a set of device identity and credentials; and
a second server configured to authenticate the device and create authentication evidence and assist the first server in use of the authentication evidence in establishment of the secure tunnel, the second server configured to perform a subscriber authentication using at least one subscriber credential, a second secure tunnel being established between the second server and the device based on the device authentication and being used to perform the subscriber authentication, wherein the authentication evidence created by the second server is provided by the second server to the first server through a communication exchange on at least one of the conditions of the first server requesting for authentication evidence when needed and the second server proactively providing the authentication evidence.

14. The method of claim 1, wherein the subscriber credentials are communicated over the secure tunnel for the subscriber authentication.

15. The communication system of claim 13, wherein the at least one subscriber credential is communicated over the secure tunnel for the subscriber authentication.

* * * * *